Jan. 31, 1967  P. S. BETTOLI  3,300,927
LAMINATED SHEET MATERIAL
Filed Jan. 21, 1963
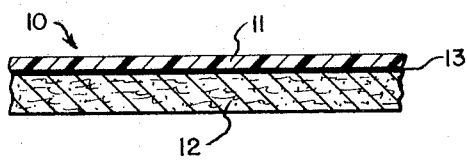
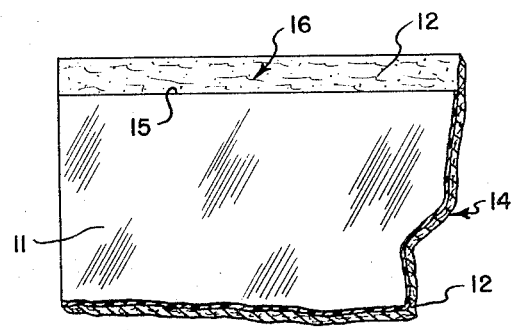
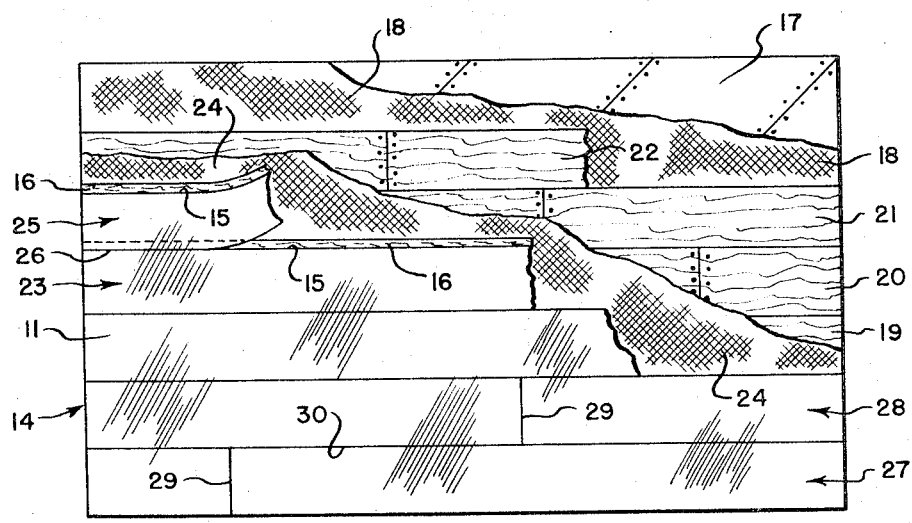
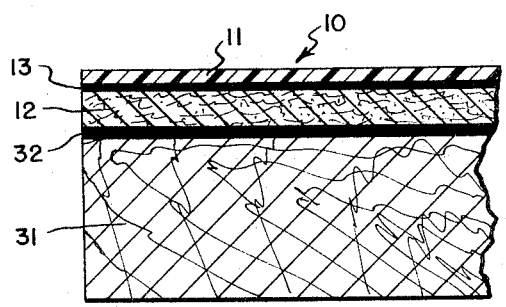
INVENTOR
Phillip Stephen Bettoli
BY
ATTORNEYS 3,300,927
LAMINATED SHEET MATERIAL
Phillip Stephen Bettoli, Martinsville, N.J., assignor to The Ruberoid Company, a corporation of New Jersey
Filed Jan. 21, 1963, Ser. No. 252,890
14 Claims. (Cl. 52—309)

This invention relates to a laminated sheet material for covering and protecting a variety of surfaces, and more particularly relates to a polyvinylfluoride laminant with excellent weathering characteristics for use in the roofing and siding trades.

It is an object of this invention to provide a material for covering and protecting the exposed surfaces of a variety of structures. It is a further object to provide a flexible roofing or siding material which can be used on surfaces having irregular or unusual contours. The material of this invention, polyvinylfluoride plastic film laminated to a non-flammable, elastomeric-impregnated asbestos felt backing, has excellent weathering characteristics and will not erode, crack or craze upon long exposure to visible or ultraviolet radiation or climatic extremes of temperature or humidity. It has excellent dimensional stability and substantially permanently remains strong and flexible under all climatic conditions. In addition, the pigmented covering material of this invention provides a decorative and colorful material having durable color and one which is substantially stain-resistant.

It is another object of this invention to provide a rigid structural material having an outer covering of polyvinylfluoride plastic film, for use in the building trades, which incorporates the advantages of the laminated sheet material described in the preceding paragraph.

It is a further object of this invention to provide a roof having a roof deck covered with a laminant material which is less than one-sixth the weight of a conventional built-up roof covering, and which possesses the desirable characteristics of being non-flammable and of not degrading with age or upon exposure to climatic extremes of weather. In its pigmented form, the laminant material retains its color and does not require periodic painting. Moreover, the mechanical strength and flexibility of the laminant accomodates itself to the expansion or contraction of the underlying roof deck.

These and other objects implicit in this specification are accomplished, in general, by the advantageous use of a laminant comprising a polyvinylfluoride plastic film adhesively secured to an asbestos felt backing which has been impregnated with an elastomeric binder, such as polychloroprene, neoprene and polyvinylacetate, polychloroprene and acrylonitrile or polychloroprene and other elastomeric additives which yield a non-flammable product. The polyvinylfluoride film is pigmented, yielding a decorative, colored laminant material. The pigmented film is substantially opaque to incident ultraviolet and visible radiation and protects the elastomer-impregnated backing and under-structure from possible photochemical degradation. The laminant may be used alone as a roofing or siding material or it may be combined with suitable rigid slabs of insulating material for use generally as a covering material for buildings.

In the accompanying drawings, FIGURE 1 is a cross-sectional view of the laminated material of this invention;

FIGURE 2 is a plan view of a section of a roofing material embodiment of this invention;

FIGURE 3 is a plan view of a roof with portions of the roofing material broken away to show the disposition of the laminated material of this invention; and FIGURE 4 is a cross-sectional view of a rigid structural material of this invention.

Polyvinylfluoride, having the structural formula:

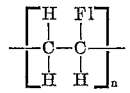

and in the form of a plastic film of uniform thickness, is the polyvinylfluoride used in the laminant of this invention. It is extremely inert and unreactive, and withstands extremes of temperature and humidity. Moreover, it is not significantly degraded by ultraviolet radiation. Being flexible and readily available in pigmented form, it is suitable for use with roofs having unusual contour or form, for example, parabolic roofs which cannot readily be covered with conventional asphaltic materials. It is also suitable for roofs where a particular color is desired, without the disadvantages of having to paint the same. It is not practical to use polyvinylfluoride film alone, however. The thickness of the film, usually 1 to 4 mils, presents handling and working problems. Used alone, it cannot be handled with available roofing tools according to established techniques. In addition, adhesives available for on-site application to roofs and the like, are inadequate for producing a satisfactory bond between the inert film and the surface to which it is applied.

Referring to FIG. 1 the laminant 10 of this invention comprises polyvinylfluoride plastic film 11 secured to an asbestos backing 12 by means of a thermosetting elastomeric adhesive 13. The bond between film and felt is permanent. The felt backing 12, which is impregnated with an elastomer, preferably neoprene, is also flexible. The combination of film and felt backing obviates the handling difficulties referred to above and enables the laminant 10 to be applied to surfaces with the usual asphaltic type adhesives. Moreover, the laminant has increased resistance to mechanical damage, punctures and tears, to which the unsupported polyvinylfluoride film would otherwise be particularly susceptible.

Bitumen-impregnated felts are unsatisfactory as a backing material for polyvinylfluoride. They can cause some staining of the plastic film, but more importantly, they are or become inflexible, usually embrittle on aging and are inflammable. Elastomeric-impregnated felt, on the other hand, remains substantially permanently flexible on exposure to climatic extremes of temperature and humidity. Proper selection of the elastomer will yield a non-flammable laminant. In this regard, polychloroprene (Du Pont neoprene) is the preferred elastomeric binder for the laminant of this invention. Since polyvinylfluoride plastic film is also non-flammable, the resultant laminant (with the non-flammable polychloroprene-impregnated backing) will possess this desirable characteristic. Other non-flammable elastomers, including mixtures of polychloroprene and polyvinylacetate or polychloroprene and other non-flammable additives may also be used to impregnate the asbestos felt. Non-flammable mixtures of polychloroprene and acrylonitrile or other elastomeric binders are also suitable. In any case, the impregnated product should be non-flammable (by which term is meant either non-combustible or self-extinguishing) providing a material having an advantage over inflammable prior art products, such as bitumen-saturated felts.

Asbestos felt is the preferred material for use in the laminant product of this invention. Organic felts or papers have been found to lack dimensional stability and flame resistance. They also embrittle and degrade with age. Glass fibers are difficult to bond to polyvinylfluoride and lack desirable elongation characteristics. Aluminum foil does not provide optimum handling characteristics and is susceptible to mechanical damage. Elastomeric-impregnated asbestos felt is preferred over ordinary, unsaturated asbestos paper, which is not suitable as a backing for use in this invention, since unimpregnated asbestos does not have the tensile strength, the tear resistance and the general toughness of the impregnated form. In addition, the unimpregnated felt is adversely affected by moisture, having poor wet strength when wetted. The porosity of unsaturated asbestos felt is such that the asbestos fibers would absorb excessive quantities of elastomeric adhesive during the step of laminating polyvinylfluoride film to the backing.

Thus, the preferred backing of the invention herein is polychloroprene-impregnated asbestos felt. It is non-flammable, retains its flexibility for long periods of time and is resistant to heat aging. It is also suitable for use with conventional mopping asphalts or cold-applied cements. Polychloroprene-impregnated asbestos felt, moreover, is not subject to microbiological degradation and is therefore superior to organic-fiber backings. The impregnated asbestos felt contains from about 15% to about 25% by weight of polychloroprene.

Other elastomeric compounds may be used to impregnate the asbestos. As indicated above, however, it is preferred that the final product be non-flammable. By way of an example, a blend of one part by weight of polyvinylacetate with three parts by weight of polychloroprene is also suitable. As in the case of polychloroprene alone, this blend is added to the asbestos felt in an amount sufficient to provide a backing having from about 15% to about 25% by weight of the blend. The quantity of polyvinylacetate in the blend may be increased to about 35%. Other suitable elastomeric mixtures include: a copolymer consisting of 82% by weight of polychloroprene and 18% by weight of acrylonitrile; or a blend of one part by weight of polychloroprene to one part by weight of acrylonitrile. Again, the quantity of these mixtures added to the asbestos should preferably be sufficient to produce a final product containing about 15% to about 25% by weight of elastomer.

Polyvinylfluoride plastic film is clear and transparent to ultraviolet and visible radiation. As an increasing amount of pigment is added to the film, the latter becomes increasingly opaque to both ultraviolet radiation and to light in the visible wave length range. Pigment may be added to the polyvinylfluoride in a quantity up to about 25% by weight, depending upon the color effect and opacity desired. It is not recommended that an amount of pigment greater than 25% by weight be added, however, as this will adversely affect the durability of the film.

Opacity of the covering film is considerably important. It has been found that if there is any substantial penetration of visible or ultraviolet light through the film, the bond of the film to the polychloroprene-impregnated felt deteriorates slowly, and ultimately will fail. Careful studies have shown that visible radiation in the near-ultraviolet portion of the spectrum causes a slow degradation of the polychloroprene, with the result that the adhesive bond to the felt fails over a period of time. When an asphaltic cement is used to adhere the felt to a roof deck or wall surface, asphalt oils which tend to migrate through the felt to the interface of felt and adhesive greatly accelerate the rate at which the photochemical decomposition of the polychloroprene takes place, leading to early failure of the adhesive binding of the film to the felt. In the presence of asphalt oils, the short wave lengths of visible light are particular destructive of the polychloroprene. Accordingly, the film should be sufficiently opaque to ultraviolet and visible light, and particularly to visible light of the shorter wave lengths, to substantially completely obscure the passage of such light to the underlying polychloroprene-impregnated felt.

A 2-mil white film, pigmented with titanium dioxide (15% by weight) will transmit about 10% of near-ultraviolet incident radiation. If the concentration of the pigment is raised to 25% by weight, 8.4% is transmitted. The addition of ½% carbon black to the latter film pigmentation reduces light transmission to 4.5% of the incident radiations. With the addition of sufficient carbon black to make the film gray, it will transmit less than 0.2% of incident radiation. (These figures all apply to transmission through the film of radiation of 5461 A.) Accordingly, the presence of at least a small amount of carbon black in the film pigments is desirable to prevent degradation of the adhesive bond of the film to a polychloroprene-impregnated felt in consequence of exposure to sunlight.

Another means that may be adopted to protect the bond of the film to a polychloroprene-impregnated felt is to pigment the adhesive which binds the film to the felt, thereby to reduce its light-transmission characteristics. Transmission of light through the adhesive may be substantially nullified by the incorporation therein of carbon black. Thus, a 2-mil film, containing 25% by weight of $TiO_2$ and with 1% by weight of carbon black in the adhesive will transmit only about 3.3% of incident radiation of 5461 A., which is in the range of destructive wave lengths. With 8% to 10% carbon in the adhesive, transmission of light through it is substantially precluded.

The effect of light transmission on bond strength is illustrated in the following table. In the table, results are given of tests on bind strength of film to felt after accelerated radiation exposure of laminants of various films bonded to polychloroprene-impregnated asbestos felt with 0.3 mil of clear adhesive (except for the laminates specified on the last line, in which case the adhesive was pigmented) the laminates in all cases were adhered to a supporting panel by an asphalt.

TABLE 1.—EFFECTS OF RADIATION ON BOND STRENGTH

[All bonds measured at 90° and given in grams/inch]

| Laminate | Percent transmission at 5,461 A. | Initial Bond | Accelerated Radiation Exposure Hours | | | |
|---|---|---|---|---|---|---|
| | | | 150 | 350 | 500 | 1,000 |
| 2-mil white (15% TiO₂) | 10 | 600 | 490 | 180 | 140 | 80 |
| 2-mil white (25% TiO₂) | 8.4 | 1,100 | 1,080 | 690 | 480 | 240 |
| 1.5-mil beige | 4.7 | 820 | | | 440 | 350 |
| 2.0-mil grey | 0.18 | 880 | | | | 1,150 |
| 2-mil white (with 4% carbon in adhesive) | 0.2 | 980 | | 1,440 | 1,550 | 1,550 |

The presence of carbon in the adhesive maintains bond strength at a high level for long periods of time. The increase in bond strength upon aging shown in one instance in Table 1 is due to post-curing. Translated into terms of service life of a roof deck covered with the laminant material of this invention, a laminant having a 2 mil white film (25% $TiO_2$) has a projected exterior life of at least 20 years. A laminant employing a 2 mil white film with carbon black in the adhesive has a projected exterior life in excess of 30 years, which is considerably greater than that of the usual roofing materials heretofore available.

It should be noted that the covering film may be varied in thicknesses. The minimum acceptable thickness is about 1 mil. Four mils thickness is approximately the upper limit, taking factors of economy and film manufacturing specifications into consideration. Should the laminant be applied to area subject to heavy traffic, a 4 mil layer of polyvinylfluoride film would be preferable.

Curing-type elastomeric adhesives are suitable for laminating polyvinylfluoride securely to the saturated asbestos felt backing. An acrylonitrile adhesive with phenolic tackifiers and an isocyanate curing agent is perhaps most suitable and may be regarded as yielding optimum results. In general, any elastomeric adhesive may be used which retains its flexibility and will not undergo resinification upon long exposure to light or climatic extremes. Polysulfide adhesives, although expensive and difficult to handle, are also suitable.

Elastomeric saturated asbestos 12 is manufactured according to established techniques with the components and in the quantities stated above. The following examples are included for purposes of illustration, it being understood that other ingredients are also useful to provide the laminant material of this invention.

*Example 1*

Polychloroprene was slurried in a paper maker's beater at about 60–70° F., along with a dispersing agent, an anti-oxidant, zinc oxide and alum, the latter having been added to precipitate the polychloroprene. The polychloroprene was added in the form of a 20% solids latex (Du Pont Neoprene Latex #735.) Additions of alum were made at the beater head box to control foam and to maintain an acid pH. Polychloroprene latex was added in sufficient quantity to provide a finished product containing 20% polychloroprene solids. Lamination of the polyvinylfluoride plastic film 11 to the polychloroprene saturated felt backing 12 was accomplished with a nitrile-phenolic adhesive (Du Pont Modified Synthetic Rubber Adhesive type 4684, containing 10% DuPont Curing Agent RC 805), to which 4% by weight of aqueous carbon black had been added. The laminating adhesive was adjusted to a viscosity of 16 to 18 (Zahn cup No. 3) with methyl ethyl ketone, and the coating roll employed for the lamination operation was adjusted to apply the equivalent of 0.5 mil of dry adhesive solids. The adhesive was applied directly to a polyvinylfluoride film of 2 mils thickness, the film then being passed through a drying tower to remove a portion of the methyl ethyl ketone. The film 11 was laminated to the smooth side of the polychloroprene-impregnated felt backing 12 by a conventional nip roll laminating operation. The nip roll was maintained at 200° F. and 120 p.s.i. Machine speed was about 150 feet per minute. (At speeds below 150 feet per minute, the temperature should be reduced to 150° F.) The laminated product 10 was then subjected to additional heat and to a high velocity air stream to remove the remainder of the laminating solvent from the finished product.

*Example 2*

A slurry of asbestos was made in a beater under the conditions and with the ingredients described in Example 1, except that in place of polychloroprene, a mixture of polychloroprene and polyvinylacetate in the weight ratio of 3:1 was charged to the beater. The amount introduced was sufficient to produce a product having 18% by weight of the elastomeric mixture. Lamination was carried out in the manner described in Example 1. A 2% by weight addition of carbon black was made to the adhesive prior to lamination and the coating roll was adjusted to apply the equivalent of 0.35 mil dry adhesive solids. The resulting product was non-flammable, flexible and otherwise suited to the variety of uses to which the laminant of this invention may be put.

The laminant material produced in either of the ways described above, or in other ways may be further processed for use as a flexible roofing or siding material; or it may be laminated, in turn, to a suitable, rigid insulating substance for use as a covering material where rigidity is a desired characteristic, as in sidings for buildings.

In the production of flexible roofing material 14 the film and felt are preferably trimmed and cut in predetermined widths. The final product thus obtained is shown in FIG. 2. Film 11 is applied to the felt 12 in a manner such that, in the final product, the longitudinal edge of the film 15 defines a selvedge 16 of a uniform width. Selvedge 16 permits overlapping of successive lengths of roofing material as described belw. It also allows for the bonding of asbestos felt on asbestos felt, and not felt on polyvinylfluoride. Hence, a wide variety of adhesives, including bitumen cements may be used. Roofing material of a standard width may also be produced without providing a film-free selvedge 16, should this be desired.

Referring now to FIG. 3, application of the roofing material shown in FIG. 2 will be described. FIG. 3 depicts a standard wood roof deck 17 which is mopped with roofing asphalt 18 (12 lbs./100 sq. ft.). It should be understood that the roofing material of this invention may be applied to a variety of roof decks, including decks of wood, concrete and insulation. It may also be applied by a variety of means, including either hot asphalt or cold cement applications. Conventional coated, sanded and asphalt-saturated base sheet 19–22 is applied to deck 17 which has been asphalt mopped. The base sheet is applied in successive lengths 19, 20, 21 and 22, with one length (21 for example) overlapping the preceding subjacent length (20) by about 4 inches. The base sheet is nailed according to established techniques.

Roofing material 14, having a selvedge 16, as shown in FIG. 2, is applied in a manner similar to base sheet 19; viz., by mopping and applying overlapping lengths of roofing material 14. Thus, the area to be occupied by a length 23 of roofing material 14 is mopped with roofing asphalt 24 (20 lbs./100 sq. ft.) and a length 23 is laid. An area adjacent the length 23 is also mopped with asphalt. The selvedge 16 of length 23 is also mopped to within one inch of the longitudinal edge 15 of the polyvinylfluoride film 11. A next length 25 of roofing material 14 is then laid with an edge 26 thereof completely covering the selvedge 16 of the first length 23 and superadjacent the same. Successive lengths are applied in the same fashion, care being taken that the selvedge 16 of each length is mopped only to a maximum of one inch away from the longitudinal edge 15. This will insure that asphalt 24 does not ooze out onto the exposed surface of the material 14. The end result of overlapping successive lengths of roofing material 14 is shown in FIGURE 3 as lengths 27 and 28. The operation may be completed by sealing the seams between overlapping lengths (i.e., end laps 29 and side laps 30) with a pressure-sensitive tape, preferably a similarly pigmented polyvinylfluoride plastic film. The seams may also be closed with a silicone caulking compound or suitable polysulfide rubber cements.

A roof to which a preferred pigmented white film roofing material 14 has been applied has a reflectivity upwards of 75% and is completely waterproof and vaporproof.

Variations of the above methods may be employed in order to adopt the product of this invention to various environments or to use the product with other mopping materials, such as a cold method cement. For example, a pre-cast concrete roof deck may be coated with the roofing material 14, by simply priming with a suitable concrete primer and then applying the roofing material 14 directly thereto with conventional roofing bitumens. Should it be desirable, a roofing material without the selvedge may also be employed. In this case, lengths of material 14 are not overlapped and the longitudinal edges of the successive lengths of material merely abut each other. The seams are then sealed with polyvinylfluoride plastic tape, silicone caulking compound or polysulfide rubber cement.

Referring to FIG. 4, a product for use in covering and protecting structures may be made by securing the laminant 10 of this invention to a rigid slab of insulating material 31 with a suitable adhesive 32, such as asphalt or the like. The laminant comprises a layer of polyvinylfluoride plastic film 11 adhesively secured (by means of adhesive 13) to elastomer-impregnated asbestos 12. The felt backing 12 is secured to the insulating material, producing a structural material wherein the polyvinylfluoride film 11 is the exposed surface. The rigid slab 31 may be manufactured from a variety of conventional insulating materials which have been found to be useful in the building trades, such as wood, including shredded wood, wood shavings, excelsior, or paper, newspaper, vermiculite, gravel, stones, cement or cement with light aggregates.

I claim:

1. A material for covering and protecting the exposed surfaces to structures comprising a substantially opaque polyvinylfluoride plastic film of low light transmissability having a uniform thickness of at least about one mil and an asbestos felt backing impregnated with polychloroprene, said polyvinylfluoride plastic film having uniformly incorporated therein up to 25% by weight of an opacifying pigment, said film adhesively secured to said backing by means of an elastomeric adhesive of low light transmissability containing up to 10% by weight of opacifying pigment.

2. A weather and fire resistant roofing material comprising a polyvinylfluoride plastic film adhesively laminated to an asbestos felt backing by means of a thermosetting elastomeric adhesive, said asbestos felt backing impregnated with a non-flammable elastomeric binder, and said plastic film being substantially opaque to protect the adhesive bond thereof to the backing from photochemical degradation.

3. A flexible roofing material comprising an asbestos felt backing impregnated with from about 15% to about 25% of polychloroprene and a polyvinylfluoride plastic film having a uniform thickness of at least about one mil secured to said asbestos felt backing by means of a thermosetting elastomeric adhesive, said film having uniformly incorporated therein up to 25% by weight of pigments comprising carbon black and being substantially opaque.

4. The roofing material of claim 3 wherein the elastomeric adhesive contains up to 10% by weight of carbon black.

5. The roofing material of claim 3 wherein the asbestos felt backing is impregnated with from about 15% to about 25% by weight of polychloroprene.

6. A weather and fire resistant flexible roofing material comprising an asbestos felt backing impregnated with from about 15% to about 25% by weight of a mixture containing one part by weight of polychloroprene and up to one part by weight of acrylonitrile, and a pigmented substantially opaque polyvinylfluoride plastic film having a uniform thickness of at least about one mil secured to said asbestos felt backing by means of a thermosetting elastomeric adhesive.

7. A weather and fire resistant flexible roofing material comprising an asbestos felt backing impregnated with from about 15% to about 25% by weight of a mixture containing polychloroprene and polyvinylacetate in the weight ratio of about 3 to 1, and a pigmented substantially opaque polyvinylfluoride plastic film having a uniform thickness of at least about one mil secured to said asbestos felt backing by means of a thermosetting elastomeric adhesive.

8. A roof comprising a roof deck and flexible roofing material covering said roof deck, said roofing material being weather and fire resistant and uniformly secured to said roof deck with an asphaltic adhesive, said roofing material comprising a pigmented substantially opaque polyvinylfluoride plastic film having a uniform thickness of at least about one mil, and an asbestos felt backing impregnated with from about 15% to about 25% by weight of polychloroprene, said film secured to said asbestos felt backing by means of a thermosetting elastomeric adhesive.

9. A roof in accordance with claim 8 wherein the width of said polyvinylfluoride plastic film is less than the width of said backing such that a film-free edge of uniform width is defined by the longitudinal edge of said film, said roofing material being disposed on said roof deck in overlapping fashion such that a superadjacent length of said roofing material covers the said film-free edge of a subjacent length of said roofing material, and wherein the seams between said length of roofing materials are sealed with pressure-sensitive adhesive tape, said tape comprising polyvinylfluoride plastic film.

10. A roof comprising a roof deck and successive lengths of flexible roofing material having a uniform width, said material covering said roof deck, said roofing material being weather and fire resistant and uniformly secured to said roof deck with an asphaltic adhesive, said roofing material comprising a pigmented substantially opaque polyvinylfluoride plastic film having a uniform thickness of at least about one mil, and an asbestos felt backing impregnated with from about 15% to about 25% by weight of polychloroprene, said film secured to said asbestos felt backing by means of a thermosetting elastomeric adhesive containing up to 10% by weight of carbon black.

11. A roof comprising a roof deck and successive lengths of flexible roofing material having a uniform width, said material covering said roof deck, said roofing material being weather and fire resistant and uniformly secured to said roof deck with an asphaltic adhesive, said roofing material comprising a pigmented substantially opaque polyvinylfluoride plastic film having a uniform thickness of at least one mil, and an asbestos felt backing impregnated with from about 15% to about 25% by weight of polychloroprene, said film secured to said asbestos felt backing by means of a thermosetting, elastomeric adhesive, said roofing material disposed on said roof deck in a manner such that a longitudinal edge of one of said lengths of roofing material abuts the longitudinal edge of another of said lengths adjacent to it, the seam defined by said abutting longitudinal edges being sealed by pressure-sensitive adhesive tape, said tape comprising polyvinylfluoride plastic film.

12. A structure for covering surfaces comprising a rigid slab of an insulating material selected from the group consisting of wood, shredded wood, wood shavings, excelsior, paper, vermiculite, gravel, cement and cement with light aggregates incorporated therein, said slab covered with a weather and fire resistant sheet material comprising an asbestos felt backing adhesively secured to said slab, said asbestos felt backing impregnated with from about 15% to about 25% by weight of polychloroprene, and a pigmented substantially opaque polyvinylfluoride plastic film having a uniform thickness of at least one mil, said film secured to said backing with a thermosetting elastomeric adhesive containing up to 10% by weight of carbon black.

13. A weather and fire resistant material for covering and protecting the exposed surfaces of structures comprising a laminate of polyvinylfluoride plastic film secured by an elastomeric adhesive to an asbestos felt backing impregnated with a non-flammable elastomeric binder, said plastic film being substantially opaque to protect the adhesive bond thereof to the backing from photochemical degradation.

14. A structure for covering surfaces comprising a rigid slab of insulating material covered with a weather and fire resistant sheet material comprising an asbestos felt backing impregnated with a non-flammable elastomeric binder and a pigmented polyvinylfluoride plastic film secured to said backing by a thermosetting elastomeric adhesive, said plastic film being substantially opaque to protect the adhesive bond thereof to the backing from photochemical degradation.

References Cited by the Examiner

UNITED STATES PATENTS

| | | | |
|---|---|---|---|
| 2,044,788 | 6/1936 | Harshberger et al. | 52—419 |
| 2,164,790 | 7/1939 | Smith | 52—409 X |
| 2,376,854 | 5/1945 | Saunders | 161—205 X |
| 2,874,652 | 2/1959 | Wilson | 52—419 |
| 3,056,224 | 10/1962 | Almy et al. | 161—205 X |
| 3,133,854 | 5/1964 | Simms | 161—189 |
| 3,228,823 | 1/1966 | Usala et al. | 161—186 |

FOREIGN PATENTS 579,626  7/1959  Canada.

OTHER REFERENCES

American Roofer and Building Improvement Contractor, TH2431.A1.A5., October 1962, page 14.

Modern Plastics, TP986.A1M6, October 1959, pages 89–91, 200.

Modern Plastics, TP986.A1M6, September 1961, page 45.

FRANK L. ABBOTT, *Primary Examiner.*

A. C. PERHAM, *Assistant Examiner.*

Disclaimer 3,300,927.—*Phillip Stephen Bettoli*, Martinsville, N.J. LAMINATED SHEET MATERIAL. Patent dated Jan. 31, 1967. Disclaimer filed Dec. 23, 1970, by the assignee, *GAF Corporation*.

Hereby enters this disclaimer to claims 2 and 13 of said patent.

[*Official Gazette February 2, 1971.*]